United States Patent
Kao et al.

(10) Patent No.: US 7,470,046 B2
(45) Date of Patent: Dec. 30, 2008

(54) BACKLIGHT MODULE AND ILLUMINATION DEVICE THEREOF

(75) Inventors: Ko-Chia Kao, Jiouru Township (TW); Chih-Kuang Cheng, Kaohsiung (TW); Jyh-Haur Huang, Hsinyuan Township (TW); Jing-Huan Liao, Taoyuan (TW)

(73) Assignee: AU Optronics Corp., Hsinchu (TW)

(*) Notice: Subject to any disclaimer, the term of this patent is extended or adjusted under 35 U.S.C. 154(b) by 19 days.

(21) Appl. No.: 11/175,746

(22) Filed: Jul. 6, 2005

(65) Prior Publication Data
US 2006/0274547 A1 Dec. 7, 2006

(30) Foreign Application Priority Data
Jan. 6, 2005 (TW) .............. 94100376 A

(51) Int. Cl.
F21V 5/00 (2006.01)
(52) U.S. Cl. .............. 362/332; 362/97; 359/626
(58) Field of Classification Search ........ 362/328, 362/329, 332, 97, 223; 359/626–628; 313/512, 313/498; 257/98, 100, 90
See application file for complete search history.

(56) References Cited

U.S. PATENT DOCUMENTS

| | | | | | |
|---|---|---|---|---|---|
| 4,025,780 | A * | 5/1977 | Krase et al. | ................ | 362/221 |
| 4,143,394 | A * | 3/1979 | Schoberl | .................. | 257/98 |
| 4,703,405 | A * | 10/1987 | Lewin | .................... | 362/333 |
| 4,984,144 | A * | 1/1991 | Cobb et al. | ................ | 362/339 |
| 6,354,709 | B1 * | 3/2002 | Campbell et al. | ........... | 362/627 |
| 6,361,190 | B1 * | 3/2002 | McDermott | ................ | 362/310 |
| 6,439,731 | B1 * | 8/2002 | Johnson et al. | .............. | 362/29 |
| 6,607,286 | B2 * | 8/2003 | West et al. | ................. | 362/255 |
| 6,666,569 | B2 | 12/2003 | Obata | | |
| 6,674,096 | B2 * | 1/2004 | Sommers | .................... | 257/98 |
| 6,679,621 | B2 * | 1/2004 | West et al. | ................. | 362/327 |
| 6,724,543 | B1 * | 4/2004 | Chinniah et al. | ............ | 359/718 |
| 7,004,610 | B2 * | 2/2006 | Yamashita et al. | .......... | 362/606 |
| 7,083,313 | B2 * | 8/2006 | Smith | ........................ | 362/555 |
| 7,142,769 | B2 * | 11/2006 | Hsieh et al. | ................. | 385/146 |
| 7,153,002 | B2 * | 12/2006 | Kim et al. | ................... | 362/327 |
| 7,254,309 | B1 * | 8/2007 | Chou et al. | ................. | 385/146 |
| 7,319,244 | B2 * | 1/2008 | Liu et al. | ...................... | 257/98 |
| 2004/0130882 | A1 * | 7/2004 | Hara et al. | ..................... | 362/31 |
| 2005/0185391 | A1 * | 8/2005 | Lee et al. | ..................... | 362/29 |
| 2006/0067078 | A1 * | 3/2006 | Beeson et al. | ............... | 362/327 |

(Continued)

FOREIGN PATENT DOCUMENTS

EP  1486818  12/2004

OTHER PUBLICATIONS

China Office Action mailed Jan. 18, 2007.

Primary Examiner—Anabel M. Ton
Assistant Examiner—Julie A Shallenberger
(74) Attorney, Agent, or Firm—Thomas, Kayden, Horstemeyer & Risley

(57) ABSTRACT

A backlight module and an illumination device thereof. The illumination device of the backlight module comprises a light source and a lens, disposed over the light source with a predetermined gap therebetween. The lens comprises a bottom surface as an incident surface, a pair of upper refracting surfaces, and a pair of lateral refracting surfaces. The upper refracting surfaces form an included angle substantially in a range of about 80° to about 120°.

53 Claims, 9 Drawing Sheets

U.S. PATENT DOCUMENTS

2006/0076568 A1*  4/2006  Keller et al. .................. 257/98
2006/0081863 A1*  4/2006  Kim et al. ..................... 257/98
2006/0104080 A1*  5/2006  Kim et al. ................... 362/555
2006/0208267 A1*  9/2006  Chin et al. .................... 257/98
2006/0273337 A1* 12/2006  Han et al. ..................... 257/98

* cited by examiner

BACKLIGHT MODULE AND ILLUMINATION DEVICE THEREOF

BACKGROUND

The invention relates to a backlight module and, more particularly, relates to an illumination device thereof.

Conventionally, backlight modules are disposed at the rear of display panels in liquid crystal displays (LCDs), providing backlight to the display panels. Backlight modules are normally direct type or side-light type, comprising a light source such as a cold cathode fluorescent lamps (CCFLs). The direct backlight module comprises a plurality of lamps with luminous flux increased by increasing the number of lamps. Thus, the direct backlight module is mostly utilized in a large-sized LCD, providing required light intensity.

The weight and thickness of the LCDs, however, increase accordingly. Since compact LCDs are currently popular, the conventional backlight module is not suitable. Side-light modules comprise a light source disposed at an edge of the module and requires a light guide plate for uniform distribution. Thus, the side-light module is more suitable for a small LCD. The light intensity emitted from the edge thereof, however, is less.

The weight of a CCFL increases with the number of lamps. Thus, another type of light source such as light emitting diodes (LEDs) replaces the CCFL for reduced weight, providing increased light intensity and lifetime. The light path of LEDs, however, is linear within a small light emitting range. Thus, a large number of LEDs must be utilized together to provide sufficient light intensity. If the arrangement and relative position of each LED varies slightly, the color of the light can be changed and light intensity reduced accordingly.

As shown in FIG. 1A, the backlight module 1 comprises a frame 15, a plurality of optical films 11, a light diffusion sheet 12, a plurality of reflective plates 13, and a plurality of light sources 14. The optical films 11, the light diffusion sheet 12, and the reflective plates 13 are connected via the frame 15. The light sources 14 are disposed over the reflective plate 13, emitting light toward the panel, as indicated by arrow L. A portion of light is reflected by the reflective plate 13, and light passing through the light diffusion sheet 11 is emitted toward the panel (not shown).

As described, the conventional backlight module 1 has a problem in that the light emitted by the LED travels in a linear direction. That is, most of the light is emitted in the panel direction. Thus, the light is not uniformly distributed. The light intensity difference between the light source 14 and the reflective plate 13 is high, causing uneven image intensity. To solve the problem, more light sources are required and must be compactly arranged such that the weight and manufacturing costs are increased, as well as temperature in the backlight module.

A side emitting type LED 14' solves the problem of the linear light path, as shown in FIG. 1B. The side emitting type LED 14' comprises an LED body 140, a base 141, and an electrical isolation stripe 143. The side emitting type LED 14' allows 80% of the light to be emitted sideways, in the direction of the arrow, however, the structure and manufacturing steps are complicated, and costs are higher. Additional light guide plate 15, reflective metal sheet 18 and other optical films are required and disposed around the LED 14' to mix and reflect the light uniformly, increasing total cost and weight.

SUMMARY

Embodiments of the present invention provide an illumination device eliminating the shortcomings described with a simplified structure and lowered cost.

Also provided is an illumination device comprising a light source and a lens disposed over the light source with a predetermined gap therebetween. The lens comprises a bottom surface as an incident surface, a pair of upper refracting surfaces, and a pair of lateral refracting surfaces. The upper refracting surfaces form an included angle substantially in a range of about 80° to about 120°.

The upper refracting surfaces and the incident surface form two acute angles. The two acute angles are substantially in a range of about 30° to about 50°. The incident surface and the lateral refracting surfaces form two obtuse angles are substantially in a range of about 100° to about 115°.

In an embodiment, the lateral cross section of the lens is substantially V-shaped.

Note that the refracting index of the lens is substantially in a range of about 1.49 to about 1.51. The predetermined gap is substantially less than about 10 mm. Preferably, the predetermined gap is substantially in a range of about 0 mm to about 2 mm. The lens comprises polymer materials, quartz, or glass. The polymer materials comprise polymethylmethacrylate (PMMA), polystyrene (PS), or polycarbonate (PC).

The light source comprises a Lamberation-type LED or a cold cathode fluorescent lamp.

Embodiments of the present invention further provide a backlight module comprising a frame, a reflective plate, at least one light source, and a lens. The reflective plate is disposed in the frame. The light source is disposed over the reflective plate. The lens, disposed over the light source with a predetermined gap therebetween, comprises a bottom surface as an incident surface, a pair of upper refracting surfaces, and a pair of lateral refracting surfaces. The upper refracting surfaces form an included angle substantially in a range of about 80° to about 120°.

The light source can be linearly, alternately, or irregularly arranged or arranged in array.

When the light source is linearly arranged, the frame comprises at least one positioning member, disposed on a sidewall of the frame and fixing the lens in the frame. The positioning member is adapted to accommodate the lens. In another embodiment, the positioning member comprises a screw.

When the light source is arranged in array or alternately or irregularly arranged, the backlight module further comprises a supporting member, disposed between the reflective plate and the lens and supporting the lens over the light source.

BRIEF DESCRIPTION OF THE DRAWINGS

Embodiments of the present invention can be more fully understood by reading the subsequent detailed description in conjunction with the examples and references made to the accompanying drawings, wherein.

DETAILED DESCRIPTION

Figure 1A:
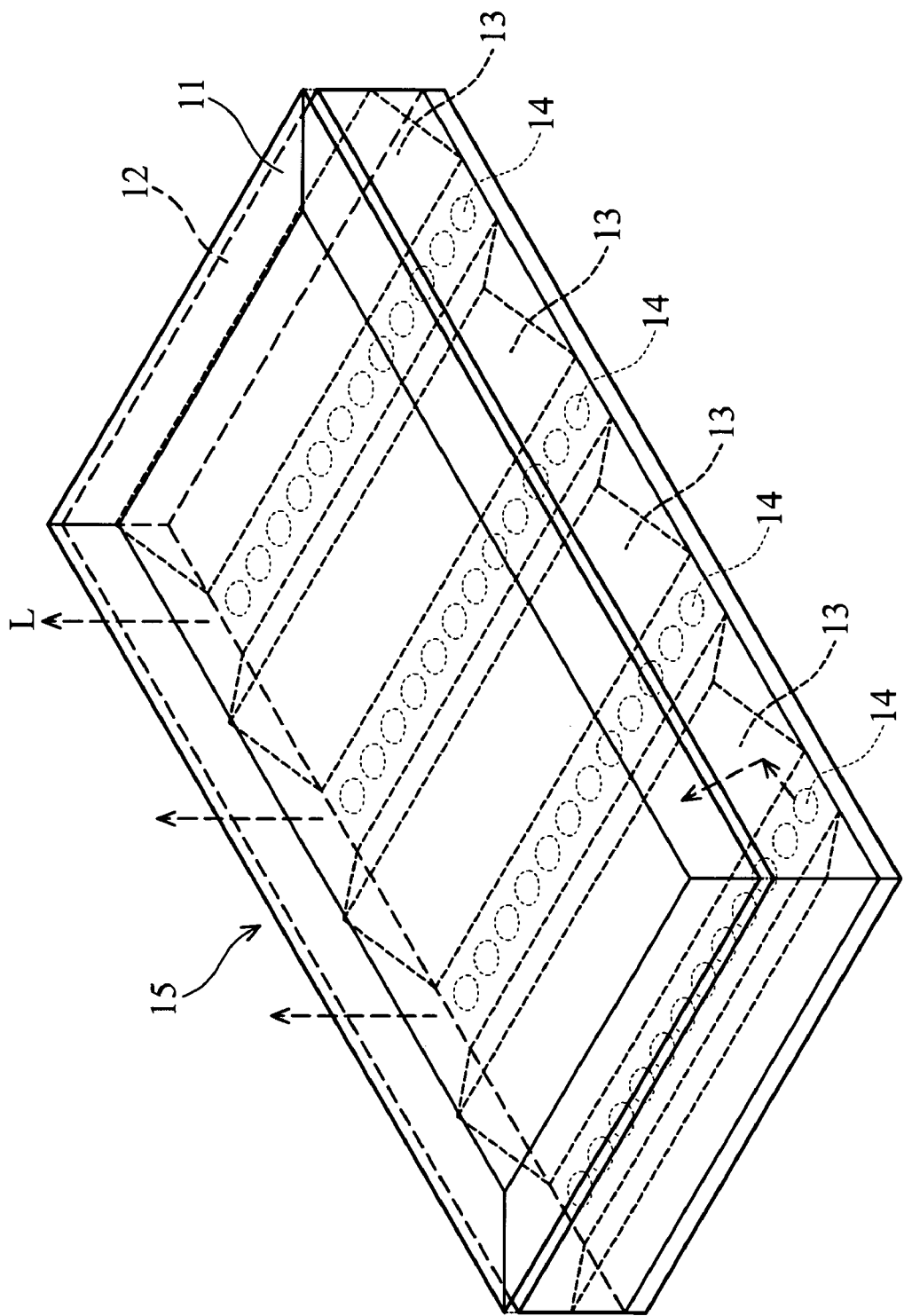
FIG. 1A is a schematic view of a conventional light source.
Figure 1B:
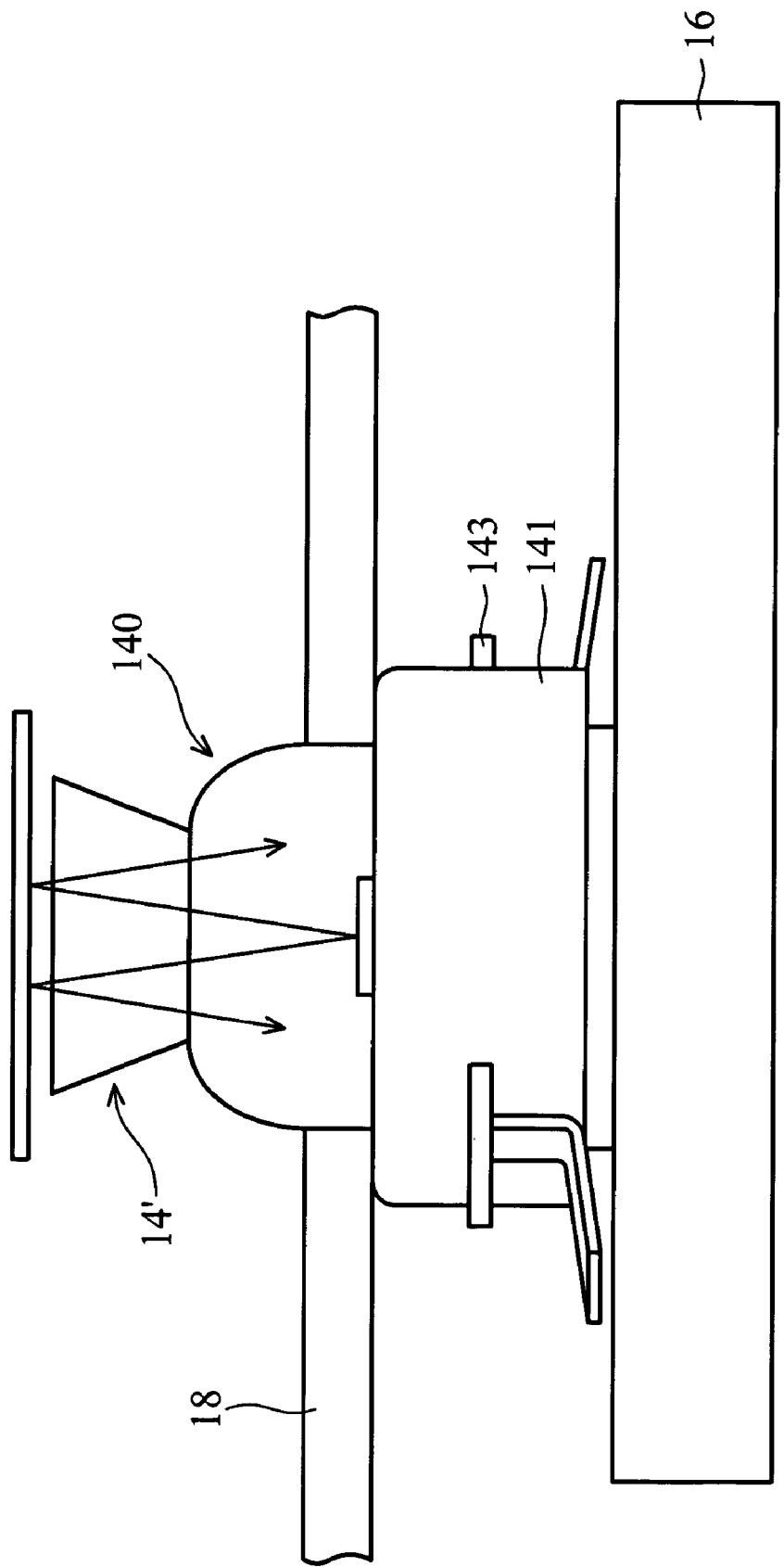
FIG. 1B is a side view of a conventional light source.
Figure 2A:
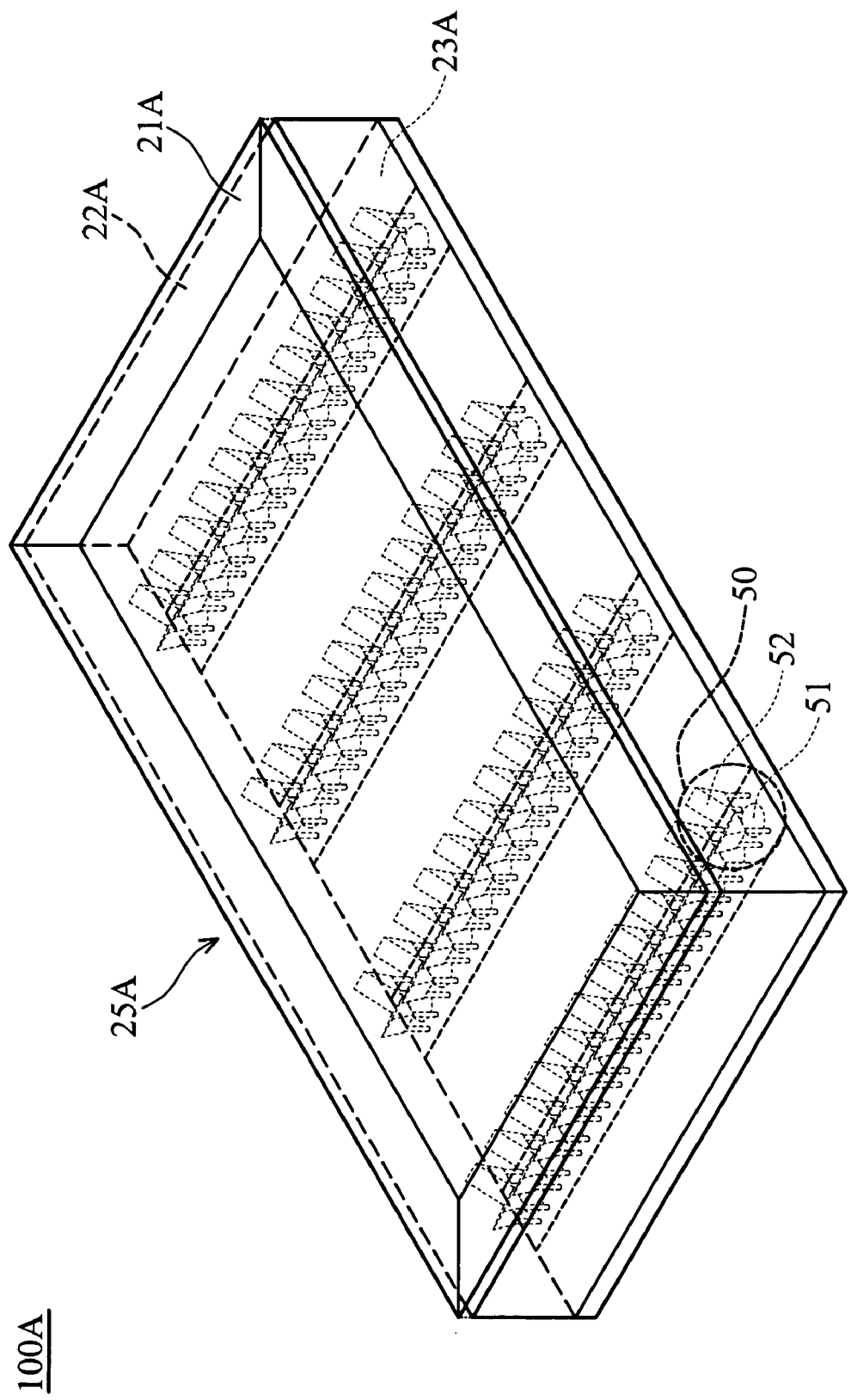
FIG. 2A is a perspective view of an embodiment of a backlight module of the present invention.

FIG. 2A is a perspective view of an embodiment of a backlight module 100A of the present invention. The backlight module 100A comprises at least one optical film 22A, a light diffusion sheet 21A, a frame 25A, a reflective plate 23A, and an illumination device 50. The illumination device 50 comprises a light source 51 and a lens 52. In this embodiment, the light source is arranged in array. The reflective plate 23A is disposed in the frame 25A. The optical film 22A and the light diffusion sheet 21A are disposed over the lens 52. The light source 51 is disposed over the reflective plate 23A. The lens 52 comprises polymer materials, quartz, or glass. The polymer materials comprise polymethylmethacrylate (PMMA), polystyrene (PS), or polycarbonate (PC). The lens 52 has a refracting index. The refracting index is substantially in a range of about 1.49 to about 1.51. The light source 51 comprises a Lamberation-type LED.

Figure 2B:
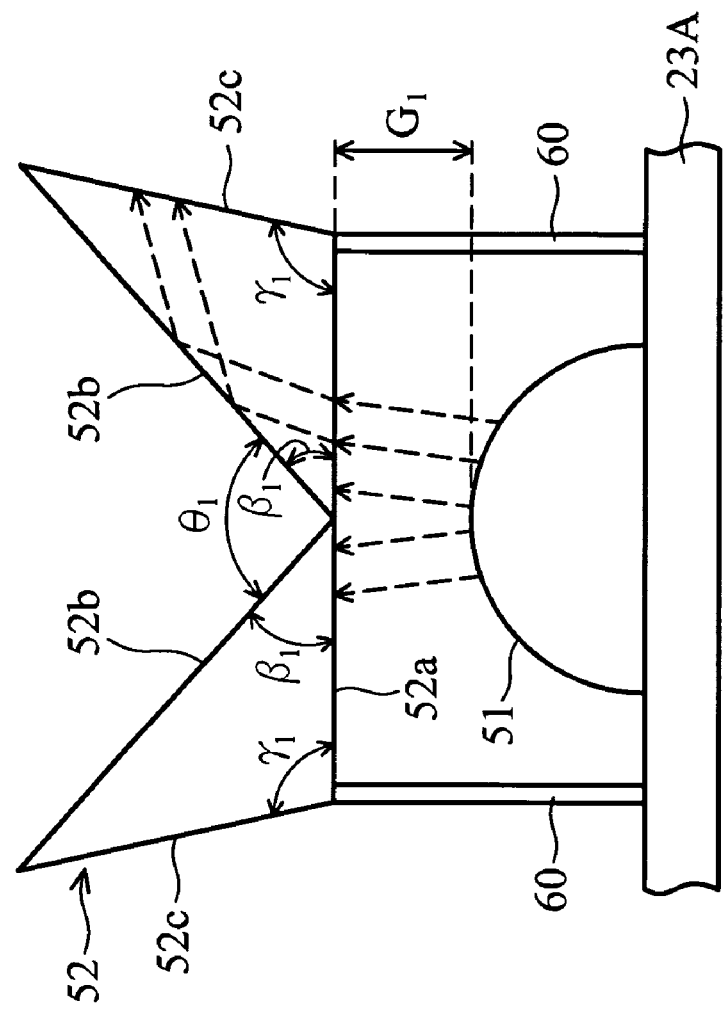
FIG. 2B is a side view of an embodiment of an illumination device of the present invention.

FIG. 2B is a side view of an embodiment of an illumination device 50 of the present invention. The lens 52 is disposed over the light source 51 with a predetermined gap $G_1$ therebetween. The backlight module 100A further comprises a supporting member 60, disposed between the reflective plate 23A and the lens 52 to support the lens 52 over the light source 51, and the supporting member 60 maintains the predetermined gap $G_1$. Thus, the distance of predetermined gap $G_1$ is defined by the supporting member 60. The predetermined gap $G_1$ is substantially less than about 10 mm.

In another embodiment, the predetermined gap $G_1$ is substantially in a range of about 0 mm to about 2 mm.

The lens 52 comprises an incident surface 52a, a pair of upper refracting surfaces 52b, and a pair of lateral refracting surfaces 52c. The incident surface 52a is a bottom surface of the lens 52. The upper refracting surfaces 52b are upper surfaces of the lens 52. The lateral refracting surfaces 52c are located at the sides of the lens 52. The incident surface 52a, one of the upper refracting surfaces 52b, and one of the lateral refracting surfaces 52c form a substantially triangular shape. The lens 52 is formed by two triangles. The upper refracting surfaces 52b form an included angle $\theta_1$. The included angle $\theta_1$ is substantially in a range of about 80° to about 120°. The upper refracting surfaces 52b and the incident surface 52a form two acute angles $\beta_1$. The acute angles $\beta_1$ are substantially in a range of about 30° to about 50°. The incident surface 52a and the lateral refracting surfaces 52c form two obtuse angles $\gamma_1$. The two obtuse angles $\gamma_1$ are substantially in a range of about 100° to about 115°.

In this embodiment, the lateral cross section of the lens 52 is substantially V-shaped.

When light from the light source 51 is emitted toward the lens 52, the light penetrates the incident surface 52a, as shown by the dashed arrow. A portion of the light passes through the upper refracting surfaces 52b, respectively, and is refracted toward the lateral refracting surfaces 52c. Thus, light is emitted in all directions around the lens 52, and is uniformly distributed. The light intensity difference between the light source and the reflective plate is significantly reduced such that image intensity is uniform. The simplified structure of the backlight module presents lower costs. Since light is uniformly emitted, the number of the light sources can be minimized, and the size thereof can be as compact as possible.

Figure 2C:
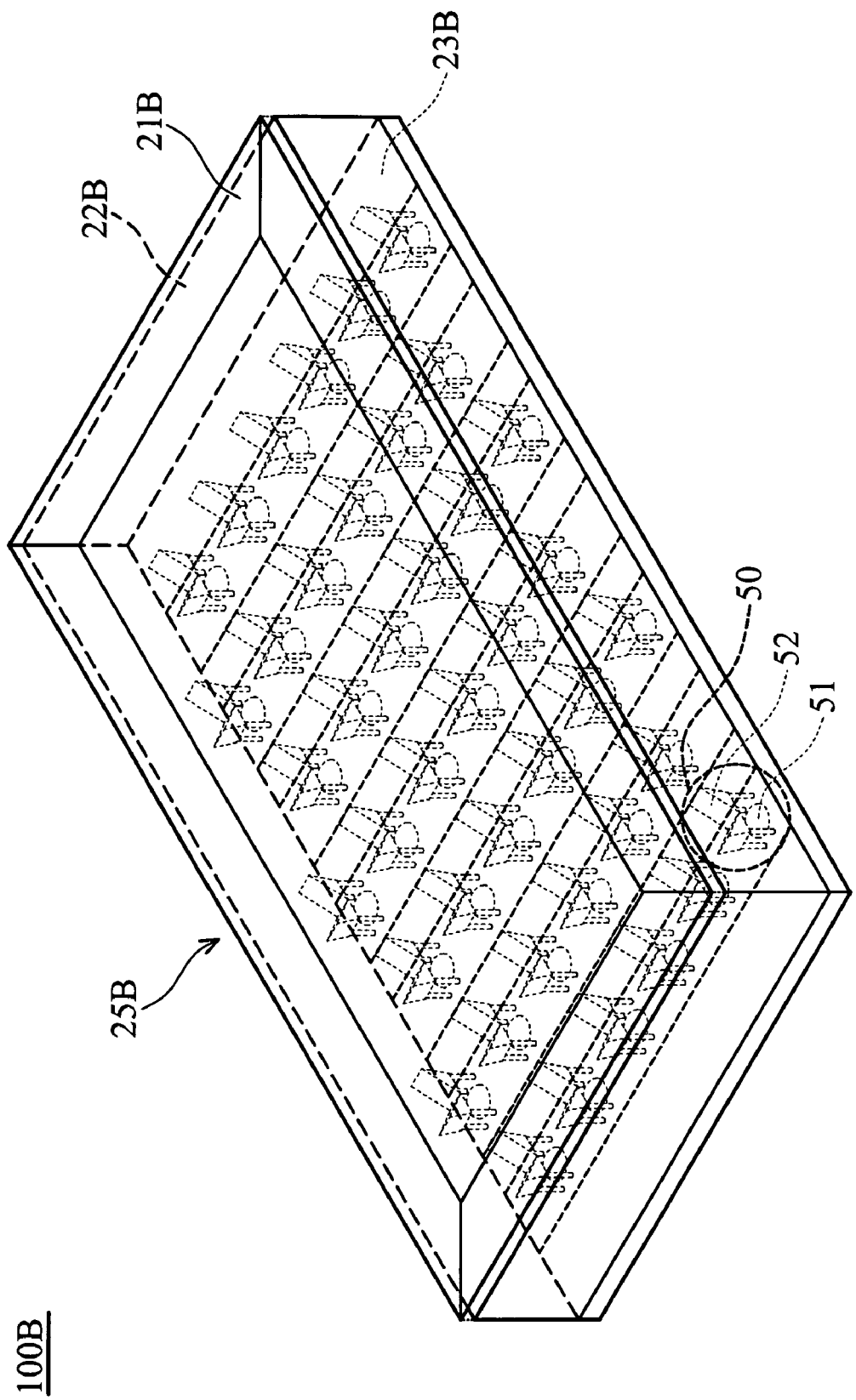
FIG. 2C is a perspective view of a variation of an embodiment of a backlight module of the present invention.

In a variation of the embodiment, as shown in FIG. 2C, the elements of the backlight module 100B common to the above embodiment are not described again. The light source 51 is not arranged in array over the reflective plate 23A, but is alternately arranged over the reflective plate 23B. Irrespective of whether the light sources 51 are arranged in array, alternately or irregularly arranged, the supporting member 60 of the backlight module 100A and 100B, disposed between the lens 52 and the reflective plates 23A and 23B, maintains the lens 52 over the light source 50 with a predetermined gap therebetween. Thus, the present invention does not limit the arrangement of the light source 51; that is, the illumination device 50 can have any type of light source arrangement.

Figure 3:
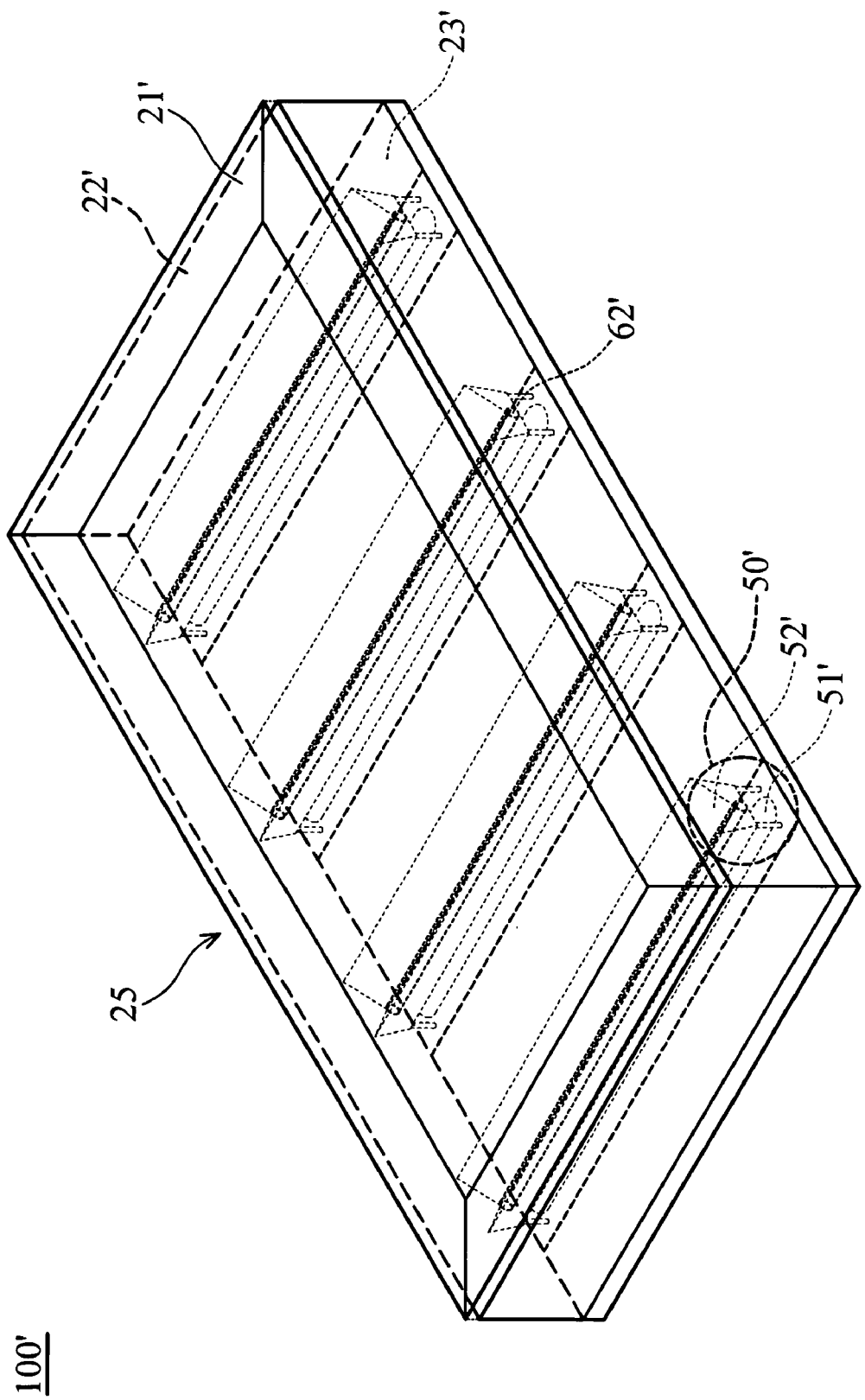
FIG. 3 is a perspective view of another embodiment of a backlight module of the present invention.

FIG. 3 is a perspective view of another embodiment of a backlight module 100' of the present invention. The structure of the backlight module 100' is similar to that of the previous embodiment. The difference is that the light source 51' can comprise a cold cathode fluorescent lamp (CCFL) or a longitudinal LED. The light source 51' can be parallel over the reflective plate 23'. The lens 52' can be stripe-shaped. The frame 25' further comprises a positioning member 62', disposed on a sidewall of the frame 25' and fixing the lens 52' in the frame 25'. In another embodiment, the positioning member 62' comprises a screw.

Figure 4A:
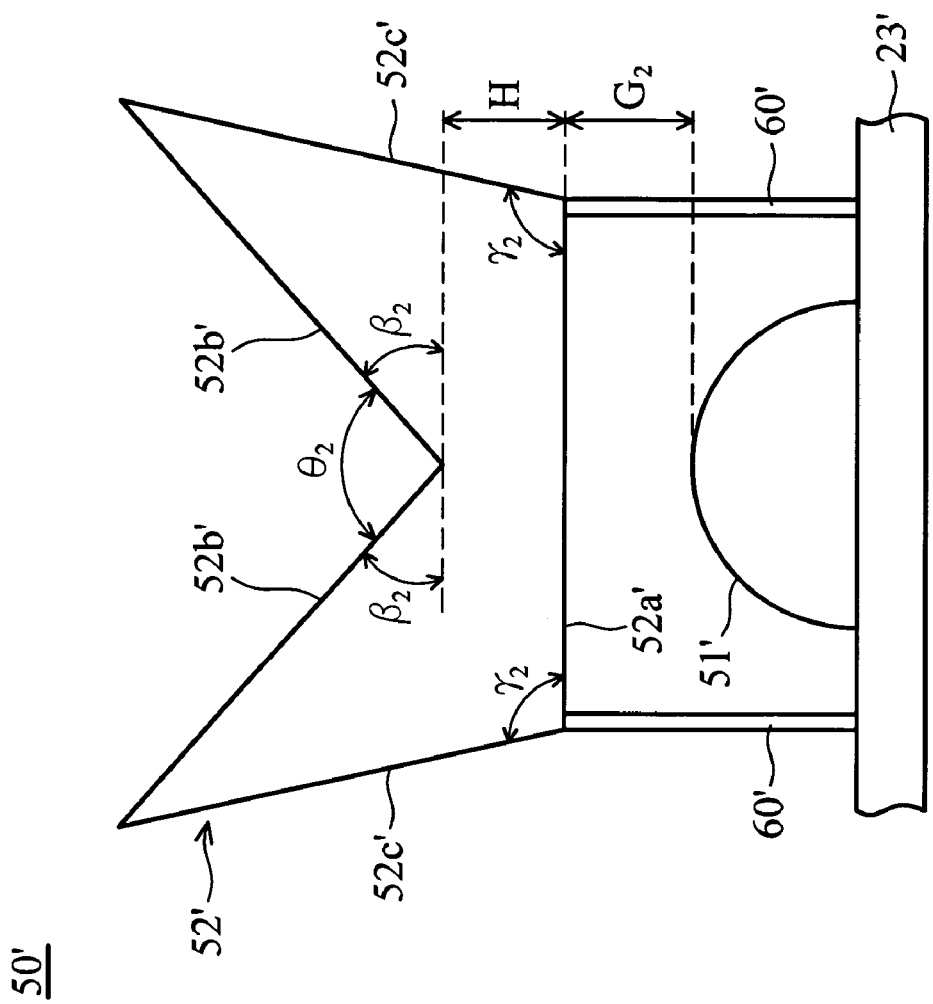
FIG. 4A is a schematic view of a variation of an illumination device.

Note that the shape of the lens 52 can be different in different embodiments. For example, in a variation, as shown in FIG. 4A, the lens 52' has an incident surface 52a', a pair of upper refracting surfaces 52b', and a pair of lateral refracting surfaces 52c'. The incident surface 52a' is a bottom surface of the lens 52'. The upper refracting surface 52b' is an upper surface of the lens 52'. The lateral refracting surfaces 52c' are located at the sides of the lens 52'. The incident surface 52a', one of the upper refracting surfaces 52b', and one of the lateral refracting surfaces 52c' form a substantially trapezoidal shaped. The lens 52 is formed by two trapezoids. The upper refracting surfaces 52b' form an included angle $\theta_2$ is substantially in a range of about 80° to about 120° with a distance H between the vertex of the included angle $\theta_2$ and the incident surface, which varies with the size of the backlight module. The upper refracting surfaces 52b' form two acute angles $\beta_2$ with a horizon. The two acute angles $\beta_2$ are substantially in a range of about 30° to about 50°. The incident surface 52a' and the lateral refracting surfaces 52c' form two obtuse angles $\gamma_2$. The two obtuse angels are substantially in a range of about 100° to about 115°. Additionally, a supporting member 60' can be disposed between the reflective plate 23' and the lens 52', supporting the lens 52' over the light source 51' with a predetermined gap $G_2$ therebetween. Note that, in this variation, if the frame comprises a positioning member 62' as shown in FIG. 3, the supporting member 60' can be eliminated, and vice versa. The combination of the supporting member 60' and the positioning member 62' further enhances structural strength. Thus, the number of supporting members 60' varies with the size of the backlight module or the lens. Moreover, the predetermined gap $G_2$ varies with the supporting member 50' or the positioning member 62'. The gap $G_2$ is substantially less than about 10 mm. Preferably, the gap $G_2$ is substantially in a range of about 0 mm to about 2 mm.

While two lens shapes are disclosed, the present invention does not limit the shape of the lens, which can be triangular, quadrilateral, trapeziform, trapezoidal shape, or a combination thereof. The cross section of the lens can be substantially V-shaped.

Figure 4B:
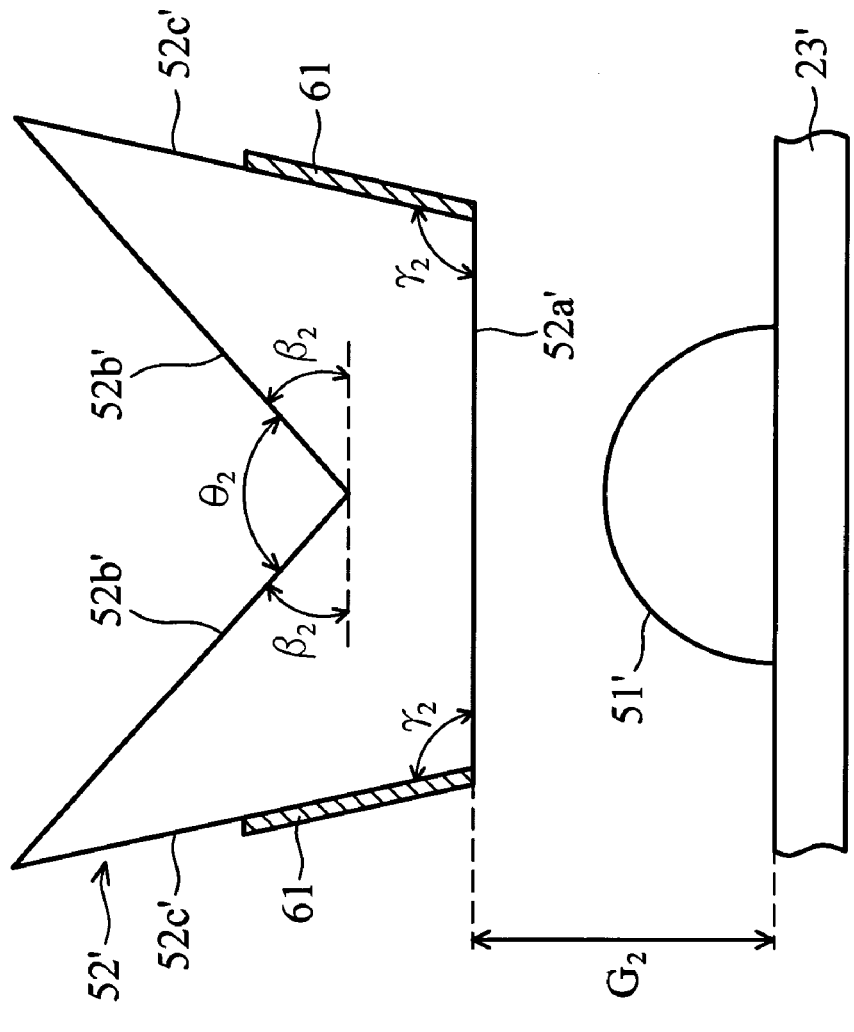
FIG. 4B is a schematic view of a variation of another embodiment of the illumination device.

When the lens 52' is longitudinal, as shown in FIG. 3, the positioning member 62' has the following variations. FIG. 4B is a schematic view of a variation of the illumination device 50'. In the variation, each positioning member 61 comprises two longitudinal components. The positioning member 61 can be disposed on two opposing sides of the frame 25', and the two longitudinal components contact two lateral refracting surfaces 52c' of the lens 52', respectively. The positioning member 62' is partially shaped substantially corresponding to the shape of the lens 52', so as to adapted to accommodate the lens 52'. Thus, the two ends of the lens 52' are engaged with the positioning member 61, respectively, to fix the lens 52' on the frame 25'.

Figure 4C:
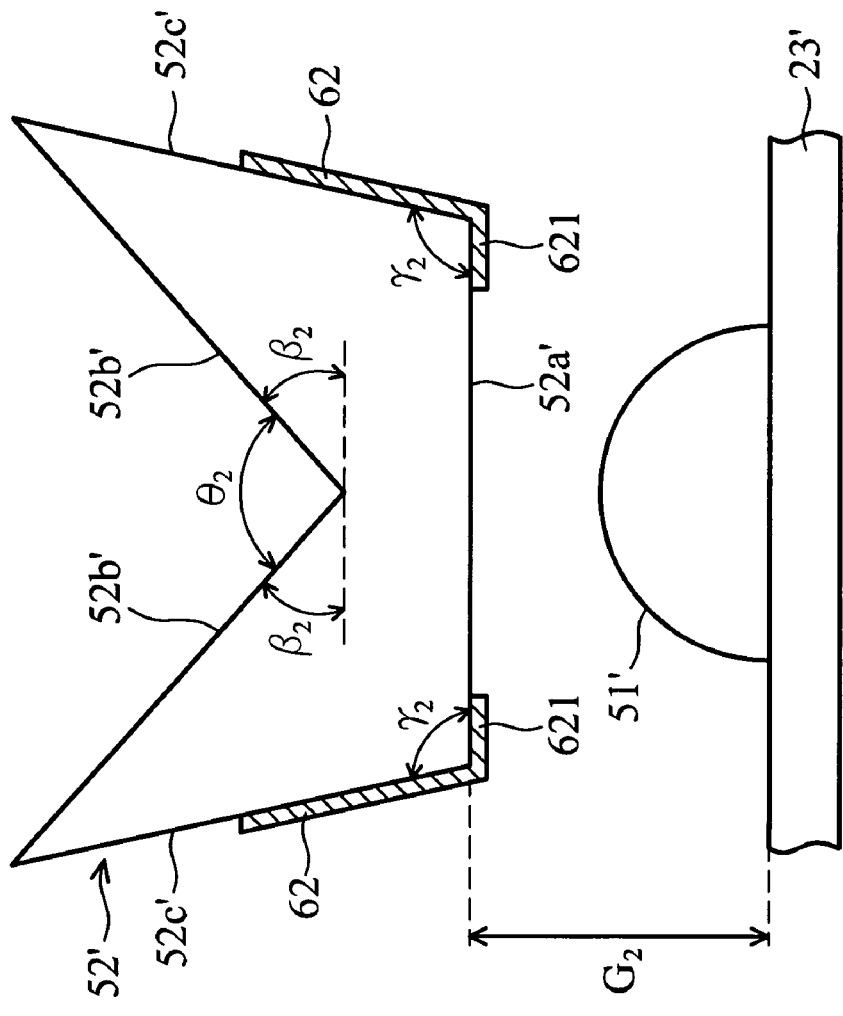
FIG. 4C is a schematic view of another variation of another embodiment of the illumination device.

FIG. 4C is a schematic view of another variation of the illumination device 50'. The difference is that the positioning member 62 comprises two L-shaped elements. The angle of the L shape is substantially identical the obtuse angle $\gamma_2$ between the incident surface 52a' and the lateral refracting surface 52c'. Similarly, the shape of the positioning member 62 partially corresponds to the shape of the lens 52'. Thus, the two ends of the lens 52' are engaged with the positioning member 62, respectively to fix the lens 52' on the frame 25'. Thus, the light path from the light source 51' is not obstructed.

In conclusion, the lens of the present invention produces light in different light paths such that a portion of the light is emitted in lateral directions. Thus, light is uniformly distributed while reducing the number of required elements, thereby reducing manufacturing costs.

While the present invention has been described by way of example and in terms of preferred embodiment, it is to be understood that the present invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An illumination device, comprising:
   a light source; and
   a lens, disposed over the light source with a predetermined gap therebetween, comprising a bottom surface as an incident surface, a pair of upper refracting surfaces, and a pair of lateral refracting surfaces,
   wherein the pair of upper refracting surfaces form an included angle substantially in a range of about 80° to about 120°, the incident surface is a substantially horizontal surface, each of the lateral surfaces is a substantially flat surface, and the incident surface and the lateral refracting surfaces form two obtuse angles are substantially in a range of about 100° to about 115°.

2. The illumination device of claim 1, wherein the upper refracting surfaces and the incident surface form two acute angles.

3. The illumination device of claim 2, wherein the two acute angles are substantially in a range of about 30° to about 50°.

4. The illumination device of claim 1, wherein the lateral cross section of the lens is substantially V-shaped.

5. The illumination device of claim 1, wherein the refracting index of the lens is substantially in a range of about 1.49 to about 1.51.

6. The illumination device of claim 1, wherein the predetermined gap is substantially less than about 10 mm.

7. The illumination device of claim 1, wherein the predetermined gap is substantially in a range of about 0 mm to about 2 mm.

8. The illumination device of claim 1, wherein the lens comprises polymer materials, quartz, or glass.

9. The illumination device of claim 8, wherein the polymer materials comprise polymethylmethacrylate (PMMA), polystyrene (PS), or polycarbonate (PC).

10. The illumination device of claim 1, wherein the light source comprises a Lamberatian-type LED or a cold cathode fluorescent lamp.

11. A backlight module, comprising:
    a frame;
    a reflective plate disposed in the frame; and
    at least one light source disposed over the reflective plate; and
    a lens, disposed over the light source with a predetermined gap therebetween, comprising a bottom surface as an incident surface, a pair of upper refracting surfaces, and a pair of lateral refracting surfaces,
    wherein the pair of upper refracting surfaces form an included angle substantially in a range of about 80° to about 120°, the incident surface is a substantially horizontal surface, and the incident surface and the lateral refracting surfaces form two obtuse angles are substantially in a range of about 100° to about 115°.

12. The backlight module of claim 11, wherein the light source is linearly arranged.

13. The backlight module of claim 11, further comprising a supporting member, disposed between the reflective plate and the lens, for supporting the lens.

14. The backlight module of claim 11, wherein the frame further comprises at least one positioning member disposed on a sidewall of the frame and fixing the lens in the frame.

15. The backlight module of claim 14, wherein the positioning member is adapted to accommodate the lens.

16. The backlight module of claim 14, wherein the positioning member comprises a screw.

17. The backlight module of claim 11, wherein the upper refracting surfaces and the incident surface form two acute angles.

18. The backlight module of claim 11, wherein the two acute angles are substantially in a range of about 30° to about 50°.

19. The backlight module of claim 11, wherein the lateral cross section of the lens is substantially V-shaped.

20. The backlight module of claim 11, wherein the refracting index of the lens is substantially in a range of about 1.49 to about 1.51.

21. The backlight module of claim 11, wherein the predetermined gap is substantially less than about 10 mm.

22. The backlight module of claim 11, wherein the predetermined gap is substantially in a range of about 0 mm to about 2 mm.

23. The backlight module of claim 11, further comprising at least one optical film disposed over the lens.

24. The backlight module of claim 11, wherein the lens comprises polymer materials, quartz, or glass.

25. The backlight module of claim 23, wherein the polymer materials comprise polymethylmethacrylate (PMMA), polystyrene (PS), or polycarbonate (PC).

26. The backlight module of claim 11, wherein the light source comprises a Lamberation-type LED or a cold cathode fluorescent lamp.

27. An illumination device, comprising:
    a light source; and a lens, disposed over the light source with a predetermined gap therebetween, comprising a bottom surface as an incident surface, a pair of upper refracting surfaces, and a pair of lateral refracting surfaces as a light exit surface, wherein the pair of upper refracting surfaces form an included angle substantially in a range of about 80° to about 120°, each of the lateral surfaces is a substantially flat surface, and the incident surface and the lateral refracting surfaces form two obtuse angles are substantially in a range of about 100° to about 115°.

28. The illumination device of claim 27, wherein the upper refracting surfaces and the incident surface form two acute angles.

29. The illumination device of claim 28, wherein the two acute angles are substantially in a range of about 30° to about 50°.

30. The illumination device of claim 27, wherein the lateral cross section of the lens is substantially V-shaped.

31. The illumination device of claim 27, wherein the refracting index of the lens is substantially in a range of about 1.49 to about 1.51.

32. The illumination device of claim 27, wherein the predetermined gap is substantially less than about 10 mm.

33. The illumination device of claim 27, wherein the predetermined gap is substantially in a range of about 0 mm to about 2 mm.

34. The illumination device of claim 27, wherein the lens comprises polymer materials, quartz, or glass.

35. The illumination device of claim 34, wherein the polymer materials comprise polymethylmethacrylate (PMMA), polystyrene (PS), or polycarbonate (PC).

36. The illumination device of claim 27, wherein the light source comprises a Lamberatian-type LED or a cold cathode fluorescent lamp.

37. A backlight module, comprising:
a frame;
a reflective plate disposed in the frame; and
at least one light source disposed over the reflective plate; and
a lens, disposed over the light source with a predetermined gap therebetween, comprising a bottom surface as an incident surface, a pair of upper refracting surfaces, and a pair of lateral refracting surfaces as a light exit surface, wherein the pair of upper refracting surfaces form an included angle substantially in a range of about 80° to about 120° and the incident surface and the lateral refracting surfaces form two obtuse angles are substantially in a range of about 100° to about 115°.

38. The backlight module of claim 37, wherein the light source is linearly arranged.

39. The backlight module of claim 37, further comprising a supporting member, disposed between the reflective plate and the lens, for supporting the lens.

40. The backlight module of claim 37, wherein the frame further comprises at least one positioning member disposed on a sidewall of the frame and fixing the lens in the frame.

41. The backlight module of claim 40, wherein the positioning member is adapted to accommodate the lens.

42. The backlight module of claim 40, wherein the positioning member comprises a screw.

43. The backlight module of claim 37, wherein the upper refracting surfaces and the incident surface form two acute angles.

44. The backlight module of claim 37, wherein the two acute angles are substantially in a range of about 30° to about 50°.

45. The backlight module of claim 37, wherein the lateral cross section of the lens is substantially V-shaped.

46. The backlight module of claim 37, wherein the refracting index of the lens is substantially in a range of about 1.49 to about 1.51.

47. The backlight module of claim 37, wherein the predetermined gap is substantially less than about 10 mm.

48. The backlight module of claim 37, wherein the predetermined gap is substantially in a range of about 0 mm to about 2 mm.

49. The backlight module of claim 37, further comprising at least one optical film disposed over the lens.

50. The backlight module of claim 37, wherein the lens comprises polymer materials, quartz, or glass.

51. The backlight module of claim 50, wherein the polymer materials comprise polymethylmethacrylate (PMMA), polystyrene (PS), or polycarbonate (PC).

52. The backlight module of claim 37, wherein the light source comprises a Lamberatian-type LED or a cold cathode fluorescent lamp.

53. The backlight module of claim 37, wherein the incident surface is a substantially horizontal surface.

* * * * *